Aug. 25, 1925.
F. F. BROOKS ET AL
1,550,874
ATTACHMENT FOR PLOWS
Filed May 12, 1923    2 Sheets-Sheet 1
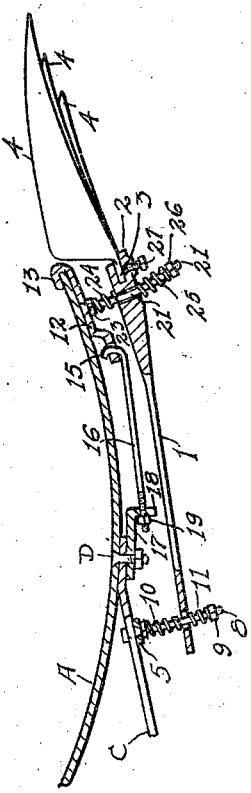
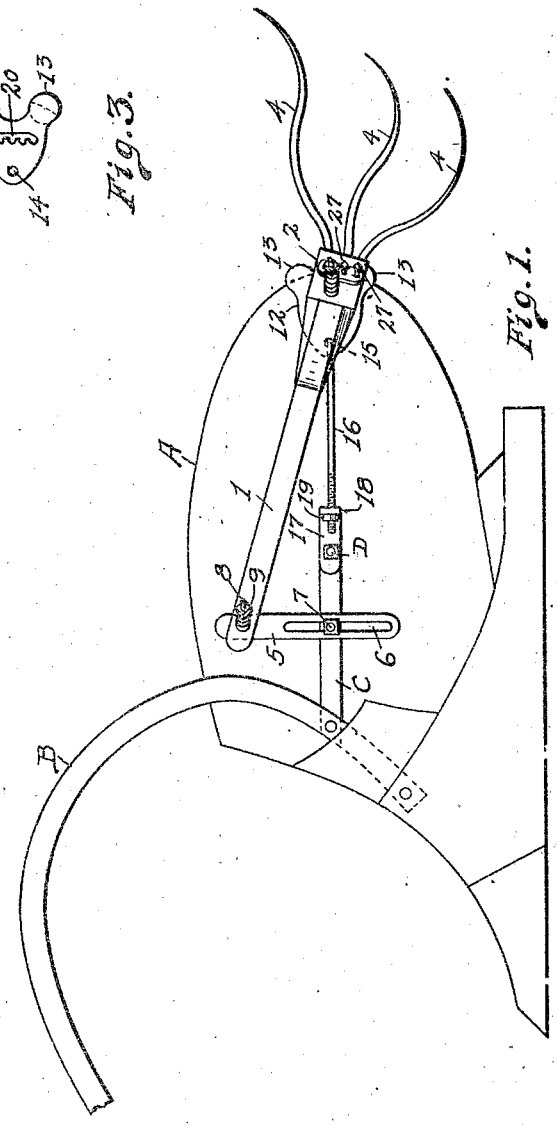
Inventors:
Fred F. Brooks and
Glendo Laws;
By Robert W. Caudle,
Attorney.

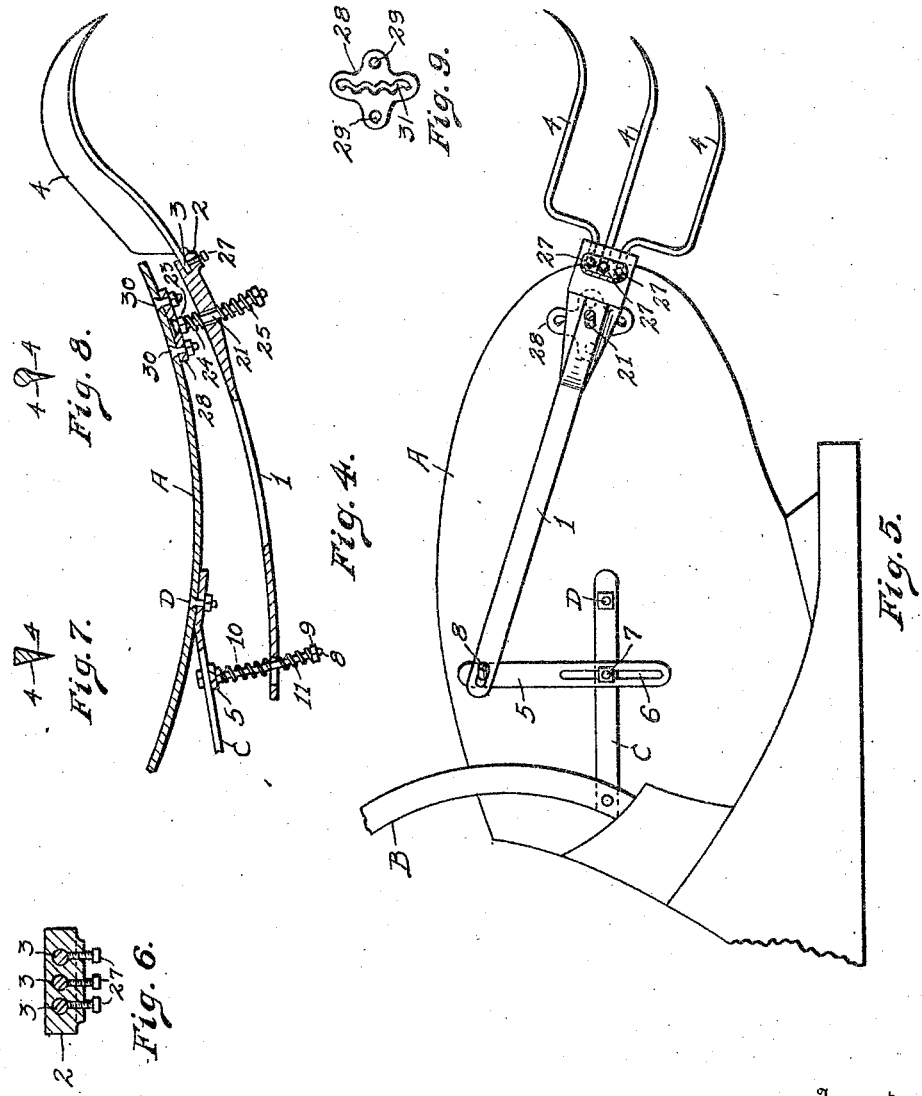

Patented Aug. 25, 1925.

1,550,874

UNITED STATES PATENT OFFICE.

FRED F. BROOKS AND GLENDO LANE, OF GREENVILLE, OHIO; SAID LANE ASSIGNOR TO SAID BROOKS.

ATTACHMENT FOR PLOWS.

Application filed May 12, 1923. Serial No. 638,649.

*To all whom it may concern:*

Be it known that we, FRED F. BROOKS and GLENDO LANE, both citizens of the United States, residing near Greenville, in the county of Darke, in the State of Ohio, have invented a new and useful Attachment for Plows, of which the following is a full, clear, and comprehensive specification, the same being such as will enable others to make, attach, and use the same.

The object of this present invention, broadly stated, is to provide an attachment for plows whereby the soil turned by the plow will be broken up and pulverized as it leaves the plow, said attachment being strong and durable in construction, positive in its results, automatic in its actions, easily and quickly attached to a plow, adjustable to various sizes and makes of plows, self compensating to meet conditions in various kinds and conditions of soil, and which can be manufactured, installed, and sold at a comparatively low price.

Another object of our invention is to provide a device which can be easily attached to a breaking plow either during the construction of the plow or after the plow has been in use, whereby as the soil leaves the mold-board of the plow it will be engaged thereby and broken up and placed in condition for planting, at the same time the additional power required to operate our device will be practically nil.

And more particularly stated, our object is to provide an attachment for breaking plows which is adapted to engage the soil as the soil leaves the mold-board of the plow and thereby break up and pulverize the soil while it is in suspension whereby it will fall to place in comparatively fine condition with air spaces therein to hold moisture, and without requiring further working to place it in planting condition.

Other objects and advantages of the invention will suggest themselves in the course of the following description, and that which is new will be correlated in the appended claims.

The preferred means for carrying out the principles of our invention in a practical and economical manner is shown in the accompanying drawings, in which—

Figure 1 shows a portion of a plow in elevation, showing the back of the mold-board, and showing our invention in place attached thereto. Figure 2 is an enlarged horizontal section of our attachment, as taken centrally thereof and longitudinally of the parts shown in Fig. 1. Figure 3 is a detail view of one of the supporting brackets. Figure 4 is also a horizontal section of our device, but showing certain changes which are made to adapt the device to other conditions. Figure 5 is a view similar to Fig. 1 but changed to show the modifications shown in Fig. 4. Figure 6 is an enlarged sectional view taken longitudinally through the end portion 2, parallel with and near the rear of the set-screws which secure the blades in position. Figure 7 is a cross section of one of the severing blades alone. Figure 8 is a cross section of another form of blade. And Figure 9 is a side elevation of the modified form of supporting bracket employed in the construction shown in Figs. 4 and 5.

Referring now to the drawings in detail: Letter A denotes the mold-board of an ordinary breaking-plow. B denotes a portion of the plow beam, and C denotes the usual obliquely disposed brace, whose rear end is attached to the mold-board by the bolt D.

The invention proper comprises the arm 1, having an enlarged rear end 2 which is provided with a plurality of rearwardly opening sockets to receive the shanks 3 of the respective blades 4, which blades are preferably formed curved or sword-shaped. Said blades may be of any desired shape in cross section, as for instance V-shaped as in Fig. 7, or with an enlarged back or rear portion as in Fig. 8.

Numeral 5 denotes a vertical bar, having a slot 6 formed longitudinally thereof, to receive the bolt 7 by which the bar 5 is adjustably secured to the brace C whereby it may be moved up and down as desired.

Secured to the upper end portion of the bar 5 is the headed portion of the comparatively long bolt 8, which extends in a direction away from the mold-board and at right angles to the bar 5. Said bolt 8 has a nut 9 threaded on its outer portion, and surrounding the bolt 8 are two helical springs 10 and 11. The forward end portion of the arm 1 has an aperture therethrough to receive the bolt 8 loosely therein with the springs 10 and 11 engaging each side thereof, whereby the bar 1 is retained normally and resiliently in the central portion of the bolt 8, as shown, the tension of the springs on said bar being variable, depending on the position of the nut 9 upon said bolt.

Located near the back of the rear portion of the mold-board is the bracket 12, having hook portions 13 on its rear, to engage with the rear edge of the mold-board, as shown in Fig. 2.

An aperture 14 is formed through the forward end of the bracket 12 to receive the hook 15 of the rod 16. Secured on the bolt D is a plate 17 having a lug 18 turned out at right-angles thereto at its rear end through which is an aperture for the rear end portion of the rod 16. A nut 19 is threaded on the forward portion of the rod 16 to engage with the forward face of the lug 18.

It will be apparent that by tightening the nut 19 against the lug 18, the hooks 13 engaging the edge of the mold-board, the bracket 12 will be rigidly clamped in place without the necessity of forming holes through the mold-board which by reason of its hardness can not be easily drilled.

The bracket 12 is formed with a vertical notched slot 20, as in Fig. 3, or with a zig zag slot 31 as in Fig. 9, and located in said slot is the curved rod 21 which has a head counter sunk into one side of the bracket 12 where it may be locked by the nut 23 whereby the rod 21 may be adjusted throughout the length of the slot.

Near the juncture of the arm 1 and its enlarged portion 2 there is provided an aperture through which passes the rod 21. Springs 24 and 25 surround the rod 21 and engage each side of the arm 1, and a clamp-nut 26 is threaded on the outer portion of the rod 21, whereby the arm 1 is yieldably mounted to move laterally, and the tension may be controlled by means of the nut 26.

The shanks of the blades 4 are secured in their sockets in the part 2 each by a set-screw 27, whereby said blades are made removable for replacement or otherwise.

The construction described above is for attachment to mold-boards not provided with suitable holes, but where mold-boards are made with the attachment of our device in view then suitable holes may be provided, which would somewhat simplify the attaching means, as is particularly shown in Figures 4, 5 and 9.

In this latter instance a bracket 28 is provided, which has apertures 29 therein to receive the bolts 30 which are inserted in suitable holes therefor in the mold-board, and by which the bracket is attached directly to the back of the mold-board, thereby dispensing with the hooks 13, the rod 16, the plate 17, and other minor parts, as will be apparent.

It will now be seen that the soil will be lifted by the mold-board as the plow moves forward, and as the soil leaves the mold-board it will be engaged by the blades 4, the soil coming into contact with the blades at an angle whereby the moving soil will be broken up and pulverized by the blades while the soil is in motion thereby making the results more accentuated than if the soil was stationary, thereby accomplishing the desired results in a thorough and efficient manner.

Contrary to that which might be expected the device does not bring trash or old cornstalks to the surface, but they are as thoroughly turned under as though our device was not in operation.

In order to meet various conditions of soil we find that in place of the particular shape of the blades as shown, that the blades may extend parallel with each other, or various other shapes may be employed.

We desire that it be understood that various changes may be made in the several details of construction, from that herein shown and described, without departing from the spirit of the invention and without sacrificing any of the advantages thereof which are new and useful and which involves invention.

Having now fully shown and described our invention, what we claim and desire to secure by Letters Patent of the United States, is—

1. A device of the class described comprising a longitudinally slotted member adapted to be attached to a plow in the rear of the mold-board, a member adjustably coupled in the slot of said slotted member, a bracket device adapted to be coupled to said mold-board at the rear thereof, a rod adjustably coupled to said bracket device, an arm movably engaging said rod, springs engaging said rod and said slotted member and yieldingly supporting the arm thereon, and a plurality of cutting blades connected to said arm and extending rearwardly of the mold board and in position to engage the turned over soil as it leaves the mold-board.

2. An attachment for plows, comprising in combination with a mold-board and a plow-beam, with a brace connecting the beam and the mold-board in the rear of the mold-board; a vertical bar having a slot therein and parallel thereof, means for adjustably connecting said bar to said brace, an arm connected at its front end to the upper end of said bar, an enlargement formed on the rear end of said arm, there being a plurality of rearwardly opening sockets formed in said enlargement, a rearwardly extending blade secured in each of said sockets, a bracket secured to the rear portion of the mold-board, and means resiliently connecting said enlargement to said bracket.

3. An attachment for plows, in combination with the mold-board of a plow, a bracket detachably connected with the inner side of the rear portion of the mold board, a bolt extending inward from said bracket, an arm, an enlargement formed on the rear end of said arm with an aperture therethrough in which said bolt may freely operate, springs normally retaining said enlargement in the central portion of said bolt but permitting it to move horizontally against the resiliency of the springs, means for mounting the forward end of said arm whereby it may swing horizontally but resiliently retained in normal position, and a plurality of blades detachably connected to said enlargement.

4. An attachment for plows comprising, in combination with a mold-board and a plow beam, with a brace connecting the beam and the mold-board in the rear of the mold-board; a bar adjustably connected to said brace, a bolt projecting horizontally from the upper end of said bar, an arm having an aperture formed through its forward end portion to receive said bolt slidably therein, springs located on each side of said arm and surrounding said bolt for normally retaining said arm resiliently in the central portion of said bolt, an enlargement formed on the rear end portion of said arm and having an aperture therethrough, a bracket attached to the rear portion of the mold-board, a bolt extending from said bracket and slidable in said aperture in the enlargement, springs for normally retaining said enlargement in the central portion of the bolt on which it is mounted, and a plurality of blades detachably connected to said enlargement and extending rearward therefrom.

FRED F. BROOKS.
GLENDO LANE.